(12) United States Patent
Steinebach

(10) Patent No.: US 6,366,708 B1
(45) Date of Patent: Apr. 2, 2002

(54) SCANNER

(75) Inventor: Wolfgang Steinebach, Salz (DE)

(73) Assignee: BTS Holding International B.V., Breda (NL)

( * ) Notice: Subject to any disclaimer, the term of this patent is extended or adjusted under 35 U.S.C. 154(b) by 0 days.

(21) Appl. No.: 09/213,531

(22) Filed: Dec. 17, 1998

(30) Foreign Application Priority Data

Dec. 18, 1997 (DE) .......................... 197 56 362

(51) Int. Cl.$^7$ .............................. G06K 9/20; G11B 7/00
(52) U.S. Cl. ...................................... 382/312; 369/125
(58) Field of Search ................................ 382/312–324, 382/307, 309, 310; 368/41, 64, 101, 96–97, 100; 353/94; 358/494; 359/17, 22

(56) References Cited

U.S. PATENT DOCUMENTS

| 3,798,355 A | | 3/1974 | Miyaoka et al. ............ 348/101 |
|---|---|---|---|
| 3,803,353 A | * | 4/1974 | Sanderson et al. ........... 178/7.2 |
| 3,943,559 A | | 3/1976 | D'Auria et al. ............... 386/38 |
| 4,001,874 A | * | 1/1977 | Lacotte ......................... 358/2 |
| 4,689,696 A | * | 8/1987 | Plummer .................... 358/333 |
| 5,392,080 A | | 2/1995 | Galt et al. .................... 353/84 |
| 5,761,349 A | * | 6/1998 | Inatome et al. ............. 382/312 |
| 5,883,987 A | * | 3/1999 | Ogoshi et al. .............. 382/312 |
| 5,887,087 A | * | 3/1999 | Tamagawa et al. ......... 382/312 |

* cited by examiner

Primary Examiner—Jose L. Couso
Assistant Examiner—Duy M. Dang
(74) Attorney, Agent, or Firm—Joseph S. Tripoli; Harvey D. Fried; Francis A. Davenport

(57) ABSTRACT

A scanner utilizing an illuminating device, monochromatic light sources, and scanning elements to improve the color separation and reduce color crosstalk for generating chrominance component signals. The illumination device illuminates or transilluminates an image by means of the monochromatic light sources. The scanning elements converts the light obtained from the illuminated or transilluminated image into a chrominance component signal. The illumination device is implemented in such a way that the monochromatic light sources illuminate the film frame at positions which are separated from each other. Sensors are arranged in such a way that they are illuminated by the relevant associated light source.

6 Claims, 1 Drawing Sheet

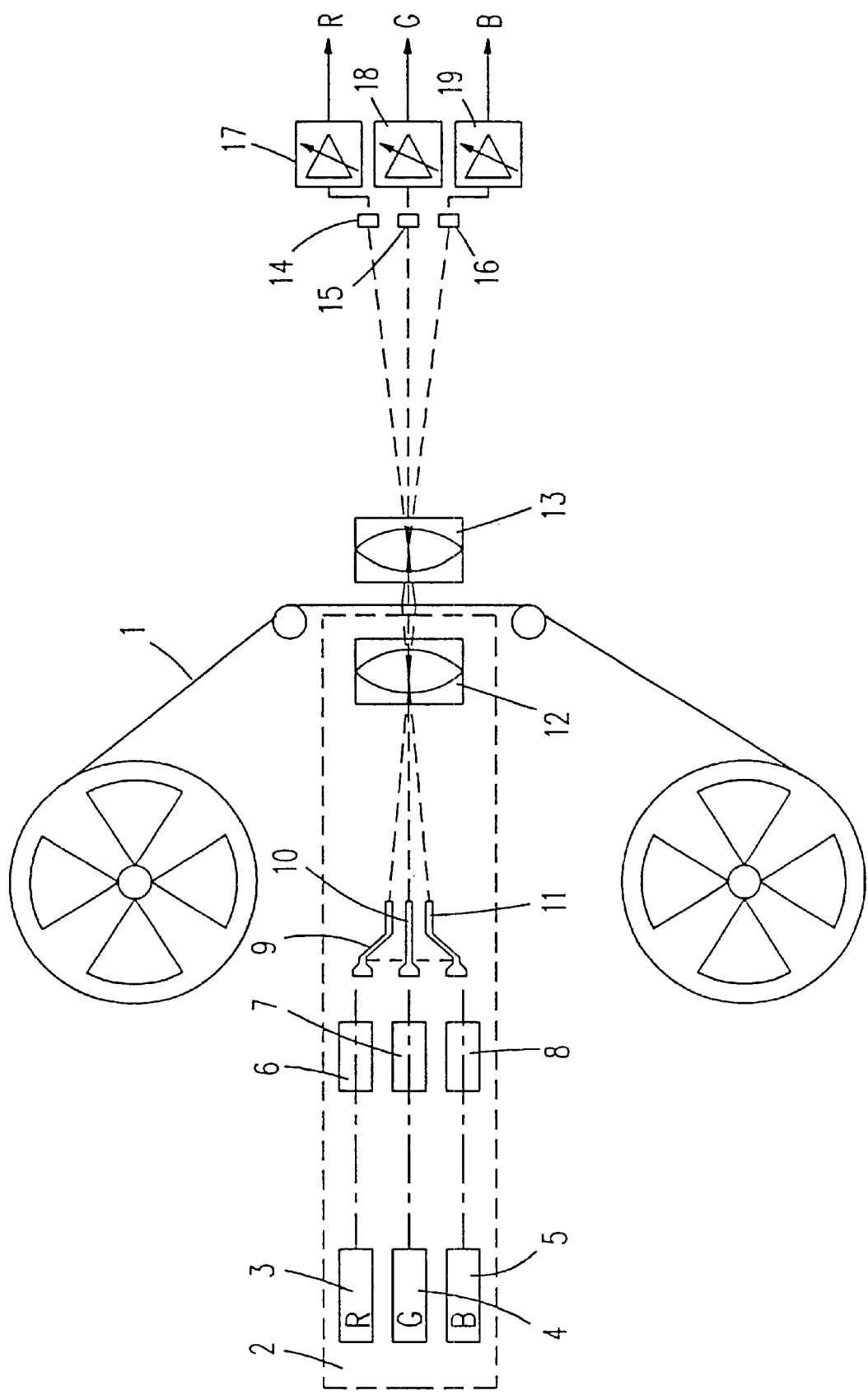

SCANNER

BACKGROUND OF THE INVENTION

The invention relates to a scanner for generating chrominance component signals, comprising an illumination device for illuminating or transilluminating an image, monochromatic light sources and scanning elements for converting the light obtained from the illuminated or transilluminated image into a chrominance component signal. The invention particularly relates to a telecine for scanning cinematographic film material.

Telecines comprise, for example, CCD elements for scanning a film, in which the film to be scanned is generally illuminated or transilluminated with a halogen or xenon light source. In a telecine, the film is transported along a color camera by means of a film transport device. To generate a color signal composed of three chrominance components, three sensors are used in the color camera, in which prepositioned color filters make each sensor sensitive in only one given spectral range. The film frame is imaged either via prism splitters on sensors which are arranged at different positions, or three sensors arranged on a chip and accommodated in a housing are illuminated. Such trilinear sensors have housing-integrated color filters for separating the colors. They provide the advantage of a small required surface area and a reduced number of components for mechanical adjustment.

A problem in these arrangements is that the sensors have different spectral sensitivities so that the power of illumination is adjusted in accordance with the most sensitive sensor. As a result, the separate sensors must be driven separately. To avoid this, U.S. Pat. No. 5,392,080 proposes, in a telecine with image-sequential alignment and scanning, to provide an illumination device constituted by three monochromatic light sources for the purpose of illumination, in which the intensity of each light source can be adjusted independently of the other light sources. Before illuminating the film to be scanned, the light currents of these light sources are mixed in a spherical integrator to a single, diffuse light current.

However, the problem still remains that the spectral sensitivity of a sensor may have maximal side values in neighboring spectral ranges, so that crosstalk may still occur in the individual sensors, in spite of the three monochromatic light sources.

SUMMARY OF THE INVENTION

It is an object of the invention to provide a solution in which the sensors supply exclusively chrominance component signals of their respective chrominance components.

This object is solved in that the illumination device is implemented in such a way that the monochromatic light sources illuminate the film frame at positions which are separated from each other, and the sensors are arranged in such a way that they are illuminated exclusively by the relevant associated light source.

The invention has the advantage that crosstalk between the separate chrominance components is completely excluded at the pick-up side by the mechanical construction of the light guidance of the monochromatic light sources used for illumination, because each sensor is illuminated by only one of the light sources. The invention has the further advantage that color filters need not be positioned in front of the sensors. Since each color filter attenuates the light to be passed to a certain extent, the power of illumination can be reduced accordingly.

In a further embodiment of the invention, the separate light sources of the illumination device are constituted by laser light sources. Since laser light is strictly monochromatic, color crosstalk is also avoided at the illumination side, as contrasted to light sources in which the monochromaticity is dependent on the quality of the filters used.

These and other aspects of the invention are apparent from and will be elucidated with reference to the embodiments described hereinafter.

BRIEF DESCRIPTION OF THE INVENTION

In the drawing:

FIG. 1 shows a telecine with separate light sources and separate illumination of the film to be scanned.

DESCRIPTION OF THE PREFERRED EMBODIMENTS

The arrangement described is particularly suitable for a telecine of the type using continuous film transport. A film 1 is transported through a scanning window by means of a film transport device (not shown) and illuminated by an illumination device 2. In the embodiment, the illumination device 2 is constituted by three illumination sources 3, 4, 5, three attenuation members 6, 7, 8, three cross-section-transducers 9, 10, 11 and an optical system 12 at the illumination side. In this embodiment, laser diodes 3, 4, 5 in the primary colors red (for example, He—Ne), green (for example, Ar—Ion) and blue (for example, He—Cd) are provided as illumination sources. The three laser beams initially pass separately the controllable attenuation members 6, 7, 8 by means of which the intensity of each laser beam can be adjusted independently of the intensity of the other two laser beams. A control or adjustment of the three different light sources in their intensity in the film plane has, inter alia, the advantage that the scanning sensors are illuminated at an optimal level, independently of the film type used. Thus, all scanning sensors operate with an optimal signal-to-noise ratio. Color balance filters may be dispensed with.

The punctiform light rays of the three laser light sources 3, 4, 5 are widened to a slit by means of the cross-section-transducers 9, 10, 11. For the purpose of illumination, this slit is imaged on the film frame in the scanning window.

The light spots widened to light slits by the cross-section-transducers 9, 10, 11 are preferably imaged on the film by means of the optical system 12 at the illumination side in such a way that the distance between the slits is as small as possible. It can thereby be ensured that there are minimal positioning errors of the film 1 during transport between the first and the last illumination slit.

By means of sensors 14, 15, 16—CCD line elements are chosen in the embodiment—the line-sequentially transilluminated film frame is scanned. Preferably, the image of the film plane is further widened by means of an optical system 13 at the sensor side, for example, a prism splitter, so that the individual sensors 14, 15, 16 can be arranged at a larger distance from each other. In this way, the influence of scattered light from one of the other light sources on the relevant sensor 14, 15, 16 can be avoided.

The scanning signals of the sensors are amplified in amplifier stages 17, 18, 19, while the gain factor of the amplifier stages 17, 18, 19 is separately adjustable so as to perform a color correction. Since, according to the invention, the film slits are imaged on the film frame at different positions, the scanning signals of the separate chrominance components must be differently delayed so as to compensate for delay time differences. For reasons of steadiness it may be necessary to control the delay times with respect to the actual transport speed and/or horizontal film movement for each chrominance component separately.

With the telecine described, the splitting of the scanned film frame into a red, green and blue color section is not performed, as hitherto, by means of color filters arranged between the film frame to be scanned and the sensors, but the film frame itself is illuminated with light of the desired spectral components at the three locations corresponding to the frame position of the CCDs.

It will be evident that the principle proposed is not limited to telecines, but may generally also used for scanning single images, for example in color scanners.

What is claimed is:

1. A scanner for generating chrominance component signals, comprising an illumination device for illuminating or transilluminating an image, monochromatic light sources and scanning elements for converting the light obtained from the illuminated or transilluminated image into a chrominance component signal, wherein the illumination device is implemented in such a way that the monochromatic light sources illuminate the film frame at positions which are separated from each other, and the sensors are arranged in such a way that they are illuminated by the relevant associated light source.

2. A scanner as claimed in claim 1, wherein the separate light sources are constituted by laser light sources.

3. A scanner as claimed in claim 2, wherein cross-section-transducers are arranged between the laser diodes and the frame to be scanned.

4. A scanner as claimed in claim 1, wherein the scanner is a telecine for scanning cinematographic film material.

5. A film scanner as claimed in claim 4, characterized in that CCD line sensors are used as sensors.

6. A film scanner as claimed in claim 4, wherein the telecine is of the type using continuous film transport.

* * * * *